United States Patent [19]

Larin

[11] Patent Number: 4,934,144
[45] Date of Patent: Jun. 19, 1990

[54] MASTER CYLINDER WITH BRAKE FLUID CONTAINER

[75] Inventor: Anders Larin, Götengurg, Sweden

[73] Assignee: AB Volvo, Gotenborg, Sweden

[21] Appl. No.: 335,679

[22] Filed: Apr. 10, 1989

[30] Foreign Application Priority Data

Apr. 26, 1988 [SE] Sweden .................. 8801558

[51] Int. Cl.⁵ .............................. B60T 11/28
[52] U.S. Cl. ...................... 60/585; 251/149.6
[58] Field of Search .......... 60/585, 588; 251/149.6, 251/149.7

[56] References Cited

U.S. PATENT DOCUMENTS

| 2,178,490 | 10/1939 | Nielsen | 60/585 X |
| 4,807,438 | 2/1989 | Tsubouchi et al. | 60/585 |

FOREIGN PATENT DOCUMENTS

| 702058 | 1/1965 | Canada | 60/585 |
| 716384 | 4/1938 | Fed. Rep. of Germany | 60/588 |
| 790250 | 11/1935 | France | 60/585 |
| 1152838 | 2/1958 | France | 60/588 |

Primary Examiner—Robert E. Garrett
Assistant Examiner—George Kapsalas
Attorney, Agent, or Firm—Young & Thompson

[57] ABSTRACT

Main brake cylinder (1) with brake fluid container (6). A valve (10) is arranged in the connection between the container and the interior of the cylinder. If the container becomes detached from the cylinder, the valve is closed automatically and prevents brake fluid from running out.

4 Claims, 1 Drawing Sheet

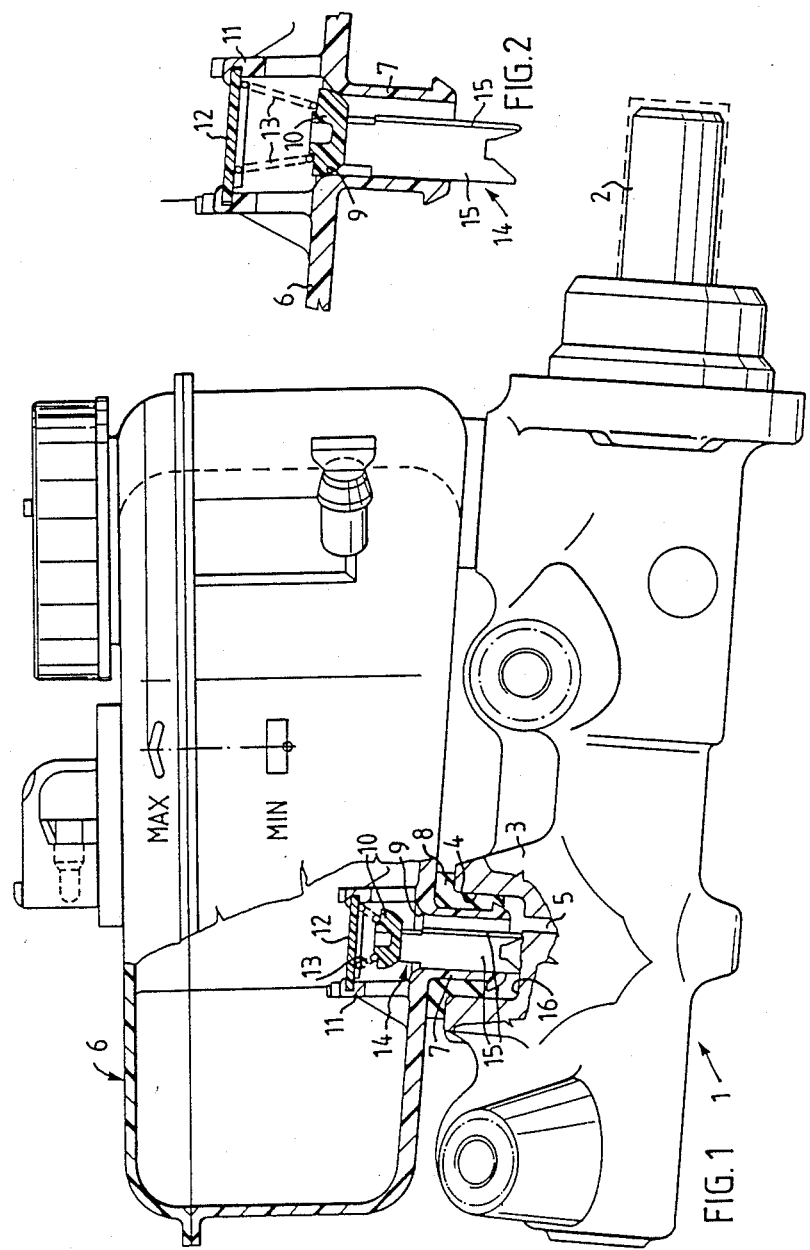

MASTER CYLINDER WITH BRAKE FLUID CONTAINER

The present invention relates to an hydraulic piston-cylinder device with a fluid container connected thereto, which container has a communicating connection to the interior of the cylinder.

Modern automobiles have in general a brake fluid container of semi-transparent plastic material, which is mounted on a brake cylinder of metal. In a known design, the bottom of the container is made with an outlet stub, which extends into an opening in the cylinder. A rubber bushing between the stub and the peripheral wall of the opening ensures that the container will be held in place under all normal conditions. In a collision, however, the risk is great that the container will be torn from the cylinder, so that brake fluid can run out into the engine compartment. Since the brake fluid is very flammable, it can cause a fire in the vehicle.

The purpose of the present invention is to provide a device which substantially reduces the risk of brake fluid spreading into the engine compartment if the brake fluid container should for some reason become detached from the cylinder.

This is achieved according to the invention in a device of the type described in the introduction by virtue of the fact that the container has a communicating connection to the interior of the cylinder, characterized in that the container has a valve arranged in said connection with a valve element loaded to a closed position, which element cooperates with an operating member, which normally holds the valve element in an open position but which permits the valve element to be moved to a closed position when the container is detached from the cylinder.

If such a container in a collision should become detached from its cylinder, the valve is closed automatically, so that no brake fluid can run out. The automatic valve function is also useful when servicing the vehicle when the brake fluid container needs to be removed from the brake cylinder by virtue of the fact that one no longer needs to drain the brake fluid first.

The invention will be described in more detail below with reference to an example shown in the accompanying drawings, where FIG. 1 shows, partially in section, a side view of a brake cylinder with a container and FIG. 2 shows a side view, in section, of the valve alone.

FIG. 1 shows a main cylinder device generally designated 1 for an hydraulic brake system for motor vehicles. A piston rod 2 extends into the cylinder and is connected to a piston device (not shown). The general construction of the brake cylinder 1 and its function are known per se and do not constitute a part of the invention. The cylinder 1 is made with a neck portion 3 which has a depression 4 into which a bore 5 from the interior of the cylinder opens. A brake fluid container 6 of semi-transparent plastic material is fixed to the cylinder 1 by an outlet stub 7 on the container extending into the depression 4 and being surrounded by a rubber bushing 8, which is pressed in between the wall of the depression 4 and the stub 7.

The interior edge 9 of the stub 7 is formed into a seat for a valve element 10. A perforated annular flange 11 surrounds the outlet and holds the plate 12, which serves as a support for one end of a helical spring 13, the other end of which bears against the valve element 10 and urges it towards the valve seat 9, as shown in FIG. 2. The valve element 10 is joined to its spindle 14 consisting of three interconnected plate members 15 forming 120° angles with each other and the outer edges of which slide against the inner wall of the stub as the spindle is displaced.

When the container 6 is mounted in the cylinder 1, the outer end of the spindle abuts against the bottom 16 of the depression 4, so that the valve element 10 assumes the position shown in FIG. 1, in which brake fluid can flow freely from the container 6 through the space between the plate members 15 of the spindle 14 and the bore 5 to the cylinder chamber of the brake cylinder 1. If the container should become detached from the cylinder, the valve element 10 under the influence of the spring 13 will be displaced to the position shown in FIG. 2, in which it seals the output and prevents brake fluid from running out.

I claim:

1. A master brake cylinder having a fluid container connected thereto, said container having a connection communicating to the interior of the cylinder and a valve disposed in said connection, said valve comprising a valve element, spring means urging said valve element to a closed position and a spindle secured to said valve element and extending into the cylinder, said spindle bearing against a surface of the cylinder to hold the valve element in an open position against the action of the spring means, said connection having an inner wall forming a guide surface for the spindle.

2. The master brake cylinder according to claim 1, wherein the spindle is solid and dentate in cross-section.

3. A fluid container for use with a master brake cylinder, comprising a container body, a connection communicating with the container body and adapted to communicate to the interior of a master brake cylinder, and a valve disposed in said connection, said valve comprising a valve element, spring means urging said valve element to a closed position and a spindle secured to said valve element, said spindle adapted to extend into a master brake cylinder and bear against a surface of a master brake cylinder when the container is connected to a master brake cylinder, thereby to hold the valve element in an open position against the action of the spring means, said connection having an inner wall forming a guide surface for the spindle.

4. The fluid container according to claim 3, wherein the spindle is solid and dentate in cross-section.

* * * * *